United States Patent
Sung et al.

(10) Patent No.: US 10,512,107 B2
(45) Date of Patent: Dec. 17, 2019

(54) APPARATUS AND METHOD FOR COMMUNICATING THROUGH RANDOM ACCESS

(71) Applicant: Korea Advanced Institute of Science and Technology, Daejeon (KR)

(72) Inventors: Dan Keun Sung, Daejeon (KR); Hong Shik Park, Daejeon (KR); Han Seung Jang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/738,305

(22) PCT Filed: Dec. 12, 2016

(86) PCT No.: PCT/KR2016/014505
§ 371 (c)(1),
(2) Date: Dec. 20, 2017

(87) PCT Pub. No.: WO2018/004086
PCT Pub. Date: Jan. 4, 2018

(65) Prior Publication Data
US 2018/0317261 A1    Nov. 1, 2018

(30) Foreign Application Priority Data
Jun. 29, 2016  (KR) .......... 10-2016-0081268

(51) Int. Cl.
*H04J 13/10*  (2011.01)
*H04W 74/08*  (2009.01)
(Continued)

(52) U.S. Cl.
CPC ........ *H04W 74/0833* (2013.01); *H04W 88/02* (2013.01); *H04W 88/08* (2013.01)

(58) Field of Classification Search
CPC .. H04W 74/0833; H04W 88/02; H04W 88/08
See application file for complete search history.

(56) References Cited

U.S. PATENT DOCUMENTS

| | | | |
|---|---|---|---|
| 2008/0168114 A1* | 7/2008 | Han | H04J 13/0062 708/209 |
| 2008/0235314 A1* | 9/2008 | Lee | H04J 13/14 708/426 |

(Continued)

FOREIGN PATENT DOCUMENTS

| | | |
|---|---|---|
| KR | 10-2014-0141501 A | 12/2014 |
| KR | 10-2015-0044391 A | 4/2015 |
| KR | 10-2015-0120831 A | 10/2015 |

OTHER PUBLICATIONS

Kim et al., "A Novel Root-index Based Prioritized Random Access Scheme for 5G Cellular Networks," School of Electrical Engineering, KAIST, Daejeon, Republic of Korea, ITC Express 1, Dec. 2015, pp. 97-101.

(Continued)

*Primary Examiner* — Lakeram Jangbahadur
(74) *Attorney, Agent, or Firm* — EIP US LLP

(57) ABSTRACT

Provided is a terminal, for example, user equipment (UE), including a processor and that performs a random access (RA) procedure with a base station, for example, eNodeB, E-UTRAN Node B, or also known as Evolved Node B, and is at least temporarily embodied by the processor. The terminal may be at least temporarily embodied by the processor. The terminal may include a generator configured to generate a preamble sequence using a first sequence corresponding to a first root index based on a preamble index that is randomly selected, and a determiner configured to determine a second root index using the preamble index as an input value of a root index function. Further, the generator may be configured to generate a tag (Continued)

sequence using a second sequence corresponding to the second root index based on a tag index that is randomly selected.

6 Claims, 6 Drawing Sheets

(51) Int. Cl.
*H04W 88/02* (2009.01)
*H04W 88/08* (2009.01)

(56) References Cited

U.S. PATENT DOCUMENTS

2015/0124579 A1* 5/2015 Sartori .................... H04J 11/00
                                                                                                                                                                    370/210
2017/0231012 A1* 8/2017 Sung ................... H04W 52/146

OTHER PUBLICATIONS

Ko et al., "A Novel Random Access for Fixed-Location Machine-to-Machine Communications in OFDMA Based Systems", IEEE Communications Letters, vol. 16, No. 9, Sep. 2012.
Han Seung Jang et al.: "A Preamble Collision Resolution Scheme via Tagged Preambles for Cellular IoT/M2M Communications", IEEE Transactions on Vehicular Technology, vol. 67, No. 2, Feb. 2018.

* cited by examiner

APPARATUS AND METHOD FOR COMMUNICATING THROUGH RANDOM ACCESS

CROSS-REFERENCE TO RELATED APPLICATIONS

This application claims priority under 35 U.S.C. § 371 to International Patent Application No. PCT/KR2016/014505 filed on Dec. 12, 2016, which claims priority to Korean Patent Application No. 10-2016-0081268 filed on Jun. 29, 2016, the disclosure of which is incorporated herein by reference.

BACKGROUND OF THE INVENTION

Field of the Invention

The present invention relates to a method of communication between terminals performing wireless communication and/or communication between a terminal and a base station, and more particularly, to a communication method of devices performing a random access (RA) procedure for communication.

Description of the Related Technology

With the fast development of Information and Communications Technologies (ICT), a hyper-connected society will become a reality in the near future. A hyper-connected society is a society in which all parts including persons, processes, data, things, etc., are connected to a network. A key structure of such a network is machine-to-machine (M2M) communication or Internet of Things (IoT)-based communication.

In a hyper-connected society, a number of independent devices performing communication will greatly increase. According to data from Cisco Corporation, things (machines, communication equipment, terminals, etc.) connected to the Internet will increase from about 10 billion in 2013 to about 50 billion in 2020 and over time all parts (persons, processes, data, things, etc.) will be connected to the Internet, forming an Internet of Everything (IoE). With the rapid expansion of IoT infrastructure, a significantly large number of nodes may perform wireless access. Accordingly, problems of wireless access collision or an insufficient wireless resource, which may occur when a wireless resource request is processed, need to be solved.

Meanwhile, to save energy, a cellular communication method among communication methods according to the related art maintains a connection with a network in a disconnected state except in case where a message is to be transmitted and initiates communication through a random access procedure when communication with the network is required. As described above, in a hyper-connected society, in many cases, communication nodes may transmit a relatively small amount of data, such as a device state message, sensing data, and smart metering data. In this case, if communication is performed by running a random access procedure as in the related art and assigning a separate resource after the random access procedure has been completed, control and signaling overhead over a data transmission amount may be great.

SUMMARY

Various aspects and example embodiments of a data transmission method through a random access procedure and an apparatus for performing the method are proposed. In detail, a new random access procedure may be performed together with and/or instead of the conventional random access method. Devices may further efficiently transmit data during the above procedure. Some aspects, which are not limited, will be described as an example.

According to an aspect, there is provided a terminal, for example, user equipment (UE), including a processor and that performs a random access procedure with a base station, for example, eNodeB, E-UTRAN Node B, or also known as Evolved Node B. The terminal may be at least temporarily embodied by the processor. The terminal may include a generator configured to generate a preamble sequence using a first sequence corresponding to a first root index based on a preamble index that is randomly selected, and a determiner configured to determine a second root index using the preamble index as an input value of a root index function, wherein the generator is configured to generate a tag sequence using a second sequence corresponding to the second root index based on a tag index that is randomly selected.

According to an example embodiment, the generator may be configured to generate the preamble sequence by cyclically shifting a first Zadoff-Chu sequence as the first sequence, and generate the tag sequence by cyclically shifting a second Zadoff-Chu sequence as the second sequence.

According to another example embodiment, the root index function used by the determiner may be set to output the second root index differing from the first root index in response to the preamble index being input.

According to another example embodiment, the generator may be configured to generate the preamble sequence by cyclically shifting the first Zadoff-Chu sequence corresponding to a 1-1-th root index in response to time alignment information of the terminal having a fixed value, and to generate the preamble sequence by cyclically shifting the first Zadoff-Chu sequence corresponding to a 1-2-th root index in response to the time alignment information of the terminal having a variable value.

According to example embodiment, the terminal may further include a communicator configured to transmit a transmission sequence including the preamble sequence and the tag sequence to the base station through a physical random access channel (PRACH).

According to another aspect, there is provided a base station comprising a processor and that performs a random access (RA) procedure with at least one terminal and is at least temporarily embodied by the processor. The base station may include a first calculator configured to calculate a first correlation value between a first Zadoff-Chu sequence corresponding to a first root index and a transmission sequence transmitted from the at least one terminal through a physical random access channel (PRACH), a second calculator configured to calculate a second correlation value between a second Zadoff-Chu sequence corresponding to a second root index and the transmission sequence, and a generator configured to generate at least one RA response (RAR) message including at least one piece of time alignment information extracted based on the calculated second correlation value.

According to an example embodiment, the first calculator may be configured to extract a preamble index included in the transmission sequence from the first correlation value, and the second calculator is configured to determine the second root index using the extracted preamble index as an input value of a root index function.

According to another example embodiment, the root index function used by the first calculator may output the second root index to allow the first Zadoff-Chu sequence and the second Zadoff-Chu sequence to be in a cross correlation.

According to another example embodiment, the generator may be configured to generate the at least one RA response message including the extracted preamble index, any one piece of the time alignment information, and RA third-step resource information, in response to the extracted preamble index being present within a predetermined first range.

According to another example embodiment, the generator may be configured to generate one RA response message including RA third-step resource information, the extracted time alignment information, and the extracted preamble index in response to one piece of the extracted time align information, in response to the extracted preamble index being present within a predetermined second range.

According to another example embodiment, the second calculator may be configured to extract the at least one piece of time alignment information corresponding to the at least one terminal using at least one peak position number of which the second correlation value is greater than or equal to a predetermined threshold value.

According to still another aspect, there is provided a terminal for performing a random access (RA) procedure with a base station and that is disposed at a fixed position and has fixed time alignment information. The terminal may include a communicator configured to receive at least one RA response message transmitted from the base station, and a processor configured to verify a first RA response message including a preamble index transmitted by the terminal and the fixed time alignment information corresponding to the terminal, from the at least one RA response message.

According to an example embodiment, the communicator may be configured to transmit transmission data to the base station based on RA third-step resource information included in the verified first RA response message.

According to another example embodiment, the processor may be configured to generate a preamble sequence by cyclically shifting a first Zadoff-Chu sequence based on a preamble index that is randomly selected from a predetermined first range and generate a tag sequence by cyclically shifting a second Zadoff-Chu sequence based on a tag index that is randomly selected, and the communicator is configured to transmit a transmission sequence including the preamble sequence and the tag sequence to the base station through a physical random access channel (PRACH).

DETAILED DESCRIPTION OF CERTAIN INVENTIVE EMBODIMENTS

Figure 1:
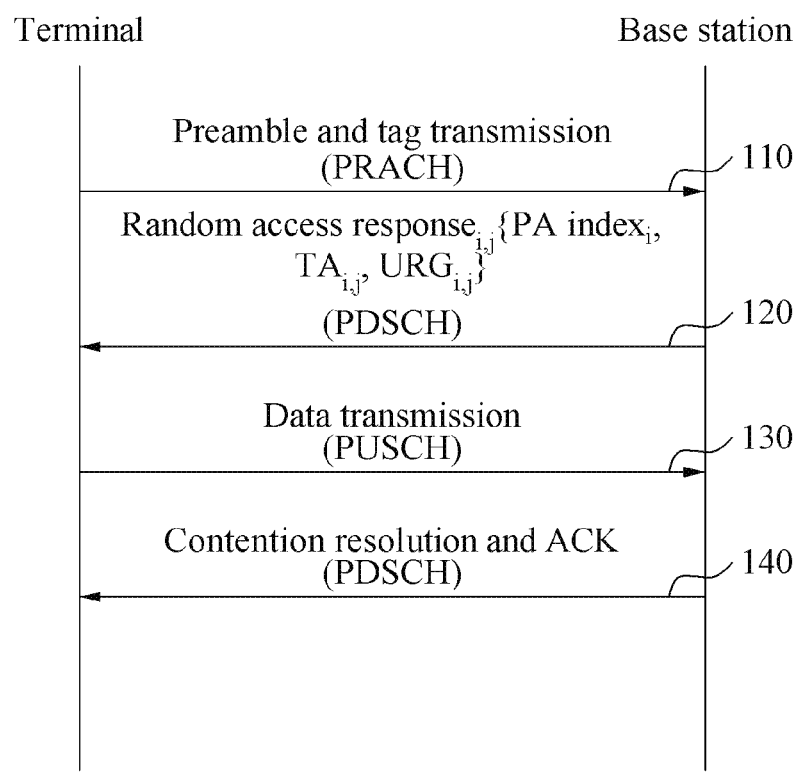
FIG. 1 is a flowchart illustrating a random access (RA) procedure of a terminal and a base station according to an example embodiment.

Best Mode for Carrying Out the Invention

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples are described in detail with reference to the accompanying drawings Like reference numerals in the drawings denote like elements, and a known function or configuration will be omitted herein.

FIG. 1 is a flowchart illustrating a random access (RA) procedure of a terminal and a base station according to an example embodiment.

Referring to FIG. 1, a terminal may encode a tag sequence in addition to a preamble sequence and transmit the same to a base station using a physical random access channel (PRACH). The base station may calculate a second correlation value corresponding to the tag sequence in addition to a first correlation value corresponding to the preamble sequence. In more detail, the tag sequence includes a tag index, and the tag index is selected independently of the preamble index and is randomly selected. Even when a first preamble index is selected from a plurality of terminals, the base station may extract time alignment information associated with a first terminal using a decoded first tag index. Based on a number of pieces of time alignment information corresponding to respective tag indexes, the base station may estimate a number of terminals that simultaneously select the first preamble index. Based on the time alignment information and the number of terminals, the base station and the terminal may continuously proceed with an RA in order to prevent a waste of PRACH resource that is already used even when a preamble collision occurs.

In operation 110, the terminal transmits a transmission sequence including the preamble sequence and the tag sequence to the base station. In an example, the terminal may generate the preamble sequence using a first sequence. In more detail the terminal may generate the preamble sequence using a first Zadoff-Chu sequence as the first sequence. In general, the Zadoff-Chu sequence is expressed as shown in Equation 1.

$$z_r[n] = \exp\left(-j\pi r \frac{n(n+1)}{N_{ZC}}\right)$$ [Equation 1]

In Equation 1, r denotes a first root index corresponding to the first Zadoff-Chu sequence. Further, $N_{ZC}$ denotes a length of the Zadoff-Chu sequence. In an example, in operation 110, the terminal may use the first root index corresponding to the preamble sequence determined from an integer range greater than or equal to 1 and less than or equal to $N_{ZC}-1$ by a cell including the terminal. In addition, the terminal may generate a preamble sequence $P_{r,i}[n]$ corresponding to Equation 2 below.

$$P_{r,i}[n]=z_r[(n+N_{CS}\times i)\bmod N_{ZC}]$$ [Equation 2]

In Equation 2, i denotes a preamble index that is randomly selected by the terminal. In operation 110, the terminal may select the preamble index from an integer range greater than or equal to 0 and less than or equal to $$\lfloor \tfrac{N_{ZC}}{N_{CS}} \rfloor -1.$$

In Equation 2, $N_{CS}$ denotes a cyclic shifting size determined based on a radius of a given cell. In operation 110, the terminal may generate the preamble sequence by cyclically shifting the first Zadoff-Chu sequence by i times the cyclic shifting size $N_{CS}$.

In another example, the terminal may generate the tag sequence using a second sequence. In more detail, the terminal may generate the tag sequence using a second Zadoff-Chu sequence as the second sequence. In still another example, the terminal may generate a tag sequence $Q_{k,l}[n]$ corresponding to Equation 3.

$$Q_{k,l}[n]=z_k[(n+N_{CS}\times l)\bmod N_{ZC}]$$ [Equation 3]

In Equation 3, k denotes a second root index corresponding to the second Zadoff-Chu sequence. In more detail, the second root index k may be determined by a root index function f(i) associated with the selected preamble index i. Further, l denotes a tag index that is randomly selected by the terminal. In operation 110, the terminal may select the tag index l from an integer range greater than or equal to 0 and less than or equal to $$\lfloor \tfrac{N_{ZC}}{N_{CS}} \rfloor -1.$$

Further, the terminal may generate the tag sequence by cyclically shifting the second Zadoff-Chu sequence by l times the cyclically shifting size $N_{CS}$.

The terminal may transmit the transmission sequence including the generated preamble sequence and the tag sequence to the base station. In more detail, the terminal may transmit, as a tagged preamble sequence, the transmission sequence to the base station through the PRACH. In an example, a transmission sequence $X_{r,k}[n]$ transmitted to the base station by the terminal is expressed as shown in Equation 4 below.

$$X_{r,k}[n]=\beta(z_r[(n+N_{CS}\times i)\bmod N_{ZC}]+z_k[(n+N_{CS}\times l)\bmod N_{ZC}])$$ [Equation 4]

In Equation 4, β denotes a transmission power of the transmission sequence. The terminal may select the tag index independently of the preamble index. In a process of selecting the preamble index and the tag index to perform the RA procedure, the terminal may perform at least two random index selections from a predetermined range and thus, an effect of reducing a possibility of collision of the transmission sequence corresponding to a preamble may be expected in the RA procedure.

In operation 120, the base station transmits an RA response message to the terminal. The base station may calculate each of the first correlation value corresponding to the preamble sequence and the second correlation value corresponding to the tag sequence. Thus, the base station may detect whether a preamble collision is present based on the time alignment information corresponding to the tag sequence even when a plurality of terminals transmit an identical preamble sequence. The base station may transmit an RA response message $RAR_{i,j}$ including the detected preamble index i, $PA\ index_j$, time alignment information $TA_{i,j}$ corresponding to a j-th terminal, and uplink resource information $URG_{i,j}$ for data transmission. Detailed description about the base terminal generating and transmitting the RA response message corresponding to the tag sequence and the preamble sequence will be provided below with reference to the following drawings. In operation 120, the terminal may receive the RA response message transmitted from the base station. In an example, when the terminal is a fixed terminal, the fixed terminal may detect a first RA response message including the time alignment information $TA_{i,j}$ corresponding to a position of the fixed terminal in addition to the preamble index i transmitted by the fixed terminal.

In operation 130, the terminal transmits data using a physical uplink shared channel (PUSCH) resource corresponding to the first RA response message. In operation 130, the base station may receive the data from the terminal. In operation 140, the base station transmits an ACK associated with the data to the terminal. The transmission may be performed through a physical downlink shared channel (PDSCH). In addition, in operation 140, the base station may transmit a contention resolution message to the terminal.

Figure 2A:
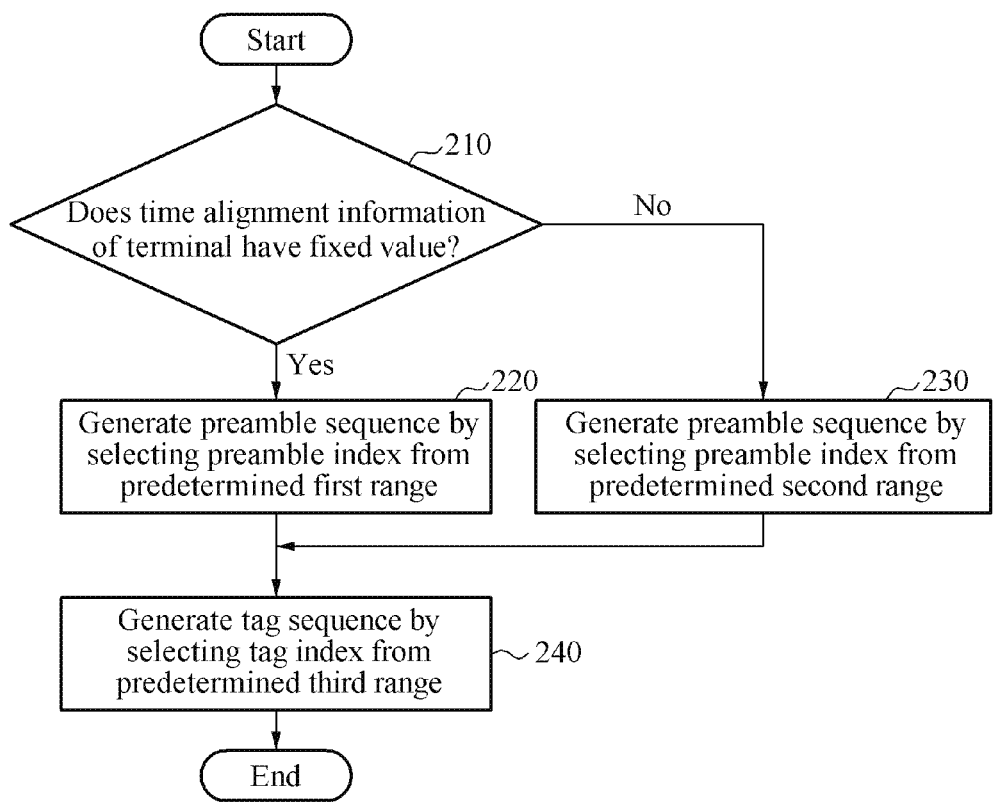
FIG. 2a is a flowchart illustrating a method by which a terminal generates a transmission sequence including a preamble sequence and a tag sequence according to an example embodiment.

FIG. 2a is a flowchart illustrating a method by which a terminal generates a transmission sequence including a preamble sequence and a tag sequence according to an example embodiment.

FIG. 2a illustrates an example of a terminal selecting preamble indexes in different ranges based on whether time alignment information of the terminal has a fixed value. In an example, the terminal having the time alignment information as the fixed value may indicate a fixed node. In another example, the terminal having the time alignment information as the fixed value may indicate a machine node associated with Internet of Things (IoT).

In operation 210, the terminal verifies whether the time alignment information of the terminal has the fixed value. For example, the terminal may compare a plurality of pieces of time alignment information verified in a process of communicating with a base station based on predetermined time interval. The terminal may verify that the time alignment information of the terminal has the fixed value when the plurality of pieces of time alignment information is present within a predetermined threshold range. In addition, in operation 210, the terminal may generate the preamble sequence using the selected preamble index.

Based on a verification that the time alignment information of the terminal has the fixed value in operation 210, the terminal selects a preamble index from a predetermined first range in operation 220. In an example, it is assumed that a number of all preamble indexes usable within a radius of cell including the terminal corresponds to $N_{PA}$. For example, the terminal may select the preamble index from the first range greater than or equal to 0 and less than or equal to K−1 from among $N_{PA}$ preamble indexes.

Meanwhile, based on the verification that the time alignment information of the terminal does not have the fixed value in operation 210, the terminal selects the preamble index from a predetermined second range in operation 230. As described above, it is assumed that the number of all preamble indexes usable within a radius of cell including the terminal corresponds to $N_{PA}$. In this example, the terminal may select the preamble index from the second range greater than or equal to K and less than or equal to $N_{PA}-1$ corresponding to a range differing from the first range from among the $N_{PA}$ preamble indexes. Similarly, in operation 220, the terminal may generate the preamble sequence using the selected preamble index. For example, when the time alignment information of the terminal does not have the fixed value, the terminal may indicate a mobile node. In another example, when the time alignment information of the terminal does not have the fixed value, the terminal may indicate user node including a smartphone, a cellular phone, and a laptop.

The first range and the second range in operations 220 and 230 are provided as examples only and should not be interpreted to limit or restrict the scope of other example embodiments. For example, an example in which a second range greater than or equal to 0 and less than or equal to K−1 and a first range greater than or equal to K and less than or equal to $N_{PA}-1$ are set among $N_{PA}$ preamble indexes are also implementable.

When operations 220 and 230 are performed, the terminal may perform operation 240. In operation 240, the terminal selects a tag index from a predetermined third range. In addition, the terminal may generate the tag sequence using the selected tag index. In more detail, the predetermined third range may include the number $N_{PA}$ tag indexes, that is, all tag indexes usable within the radius of cell. Further, the terminal may use a preamble index i selected in operation 220 or operation 230 as an input value of a root index function f(i). The terminal may determine a root index k used to generate the tag sequence based on the root index function f(i).

The root index function f(i) may be set to output the root index k differing from a root index r corresponding to the preamble sequence when the selected preamble index i is input. Thus, the terminal may set the root index k to allow a first Zadoff-Chu sequence corresponding to the preamble sequence and a second Zadoff-Chu sequence corresponding to the tag sequence to be in a cross correlation based on a root index function.

According to an example embodiment, the preamble index may be selected in different ranges based on whether the terminal is a fixed node that knows the time alignment information of the terminal or a mobile node that does not know the time alignment information of the terminal. Based on a selection of the terminal, the base station may calculate a first correlation value corresponding to the preamble index and verify whether each of a plurality of terminals is a fixed node or a mobile node using the preamble index extracted from a result of calculation. Also, the base station may extract time alignment information of each of the terminals from the tag sequence transmitted through a physical random access channel (PRACH). In terms of the tag sequence, the terminals may set the base station to extract the time alignment information and prevent the tag sequence from overlapping by randomly selecting the tag sequence based on whether each of the terminals is the fixed node or the mobile node and the number of all independently generable indexes.

Figure 2B:
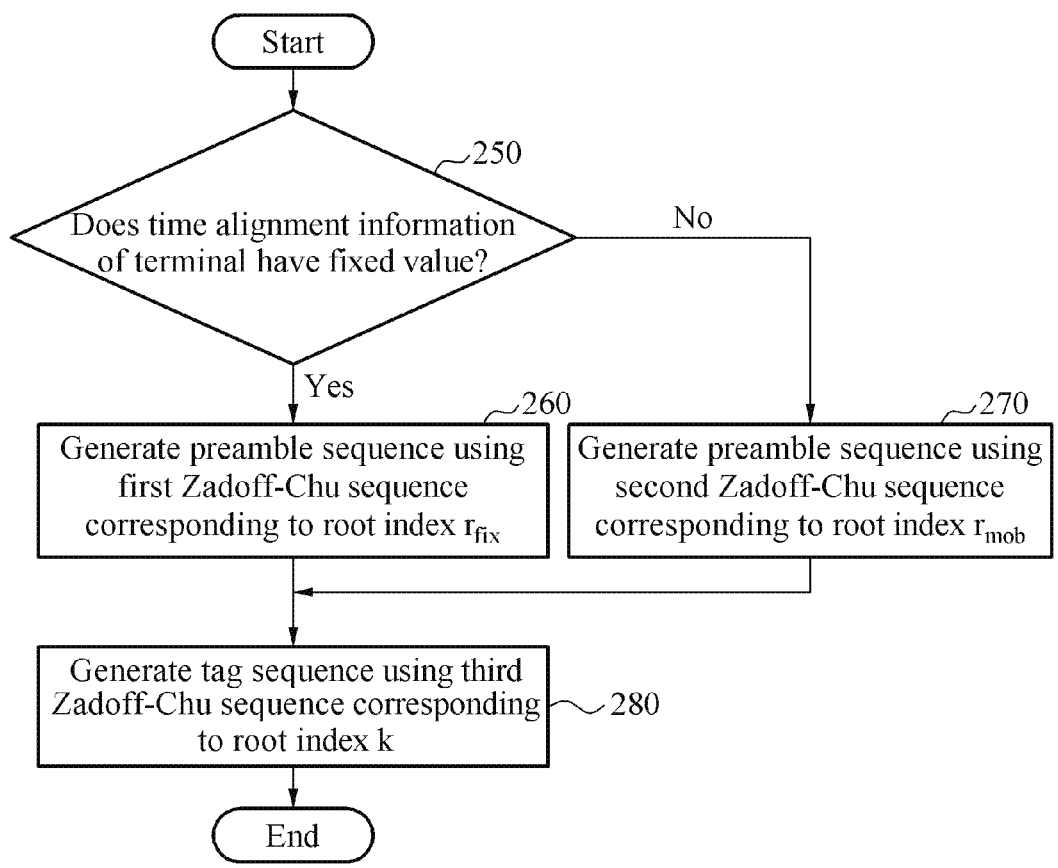
FIG. 2b is a flowchart illustrating a method by which a terminal generates a transmission sequence including a preamble sequence and a tag sequence according to another example embodiment.

FIG. 2b is a flowchart illustrating a method by which a terminal generates a transmission sequence including a preamble sequence and a tag sequence according to another example embodiment.

FIG. 2b illustrates an example of a method by which the terminal generates the preamble sequence using a Zadoff-Chu sequence corresponding to different root indexes based on whether time alignment information of the terminal has a fixed value.

In operation 250, the terminal verifies whether the time alignment information of the terminal has the fixed value. Repeated descriptions will be omitted for increased clarity and conciseness because the descriptions of operation 210 are also applicable to operation 250.

Based on a verification that the time alignment information of the terminal has the fixed value in operation 250, the terminal generates the preamble sequence using a first Zadoff-Chu sequence corresponding to a root index $r_{fix}$ in operation 260. As described above, it is assumed that a number of all preamble indexes usable within a radius of cell including the terminal corresponds to $N_{PA}$. In more detail, the terminal may select any one preamble index in a range of all preamble indexes, that is, a range greater than or equal to 0 and less than or equal to $N_{PA}-1$. The terminal may generate the preamble sequence by cyclically shifting the first Zadoff-Chu sequence by a multiple of the selected preamble index.

Meanwhile, based on the verification that the time alignment information of the terminal does not have the fixed value in operation 250, the terminal generates the preamble sequence using a second Zadoff-Chu sequence corresponding to a root index $r_{mob}$ in operation 270. However, in this example, the terminal may also select any one preamble index from the range of all preamble indexes, that is, the range greater than or equal to 0 and less than or equal to $N_{PA}-1$. Similarly, the terminal may generate the preamble sequence by cyclically shifting the second Zadoff-Chu sequence by the multiple of the selected preamble index.

When operation 260 or operation 270 is performed, the terminal may perform operation 280. In operation 280, the terminal generates the tag sequence using a third Zadoff-Chu sequence corresponding to a root index k. Similarly in operation 270, the terminal may select any one tag index in a range of all tag indexes, that is, a range greater than or equal to 0 and less than or equal to $N_{PA}-1$. Further, the terminal may generate the tag sequence by cyclically shifting the third Zadoff-Chu sequence by a multiple of the selected tag index.

The terminal may use Zadoff-Chu sequences corresponding to different root indexes based on whether the terminal is a fixed node that knows the time alignment information of the terminal or a mobile node that does not know the time alignment information of the terminal. The base station may calculate a first correlation value with the first Zadoff-Chu sequence corresponding to the first root index and a second correlation value with the second Zadoff-Chu sequence corresponding to the second root index from a sequence transmitted through the PRACH, and detect a number of the fixed node and the mobile node among a plurality of terminals based on a result of calculation. Further, the base station may extract time alignment information of each of the terminals from the tag sequence transmitted through the PRACH. Based on whether the terminal is the fixed node or the mobile node and the extracted time alignment information, the base station may perform an RA procedure by transmitting a plurality of RA response messages. Detailed descriptions of a process by which the base station transmits an RA response message will be provided with reference to the following drawings.

The descriptions of an RA method of the terminal provided with reference to FIGS. 2a and 2b are also applicable to descriptions of an apparatus. For example, operations 260, 270, and 280 may be performed by a generator which is at least temporarily embodied by a processor. Further, a process of determining the root index corresponding to the tag sequence in operation 240 may be performed by a determiner which is at least temporarily embodied by the processor.

Figure 3:
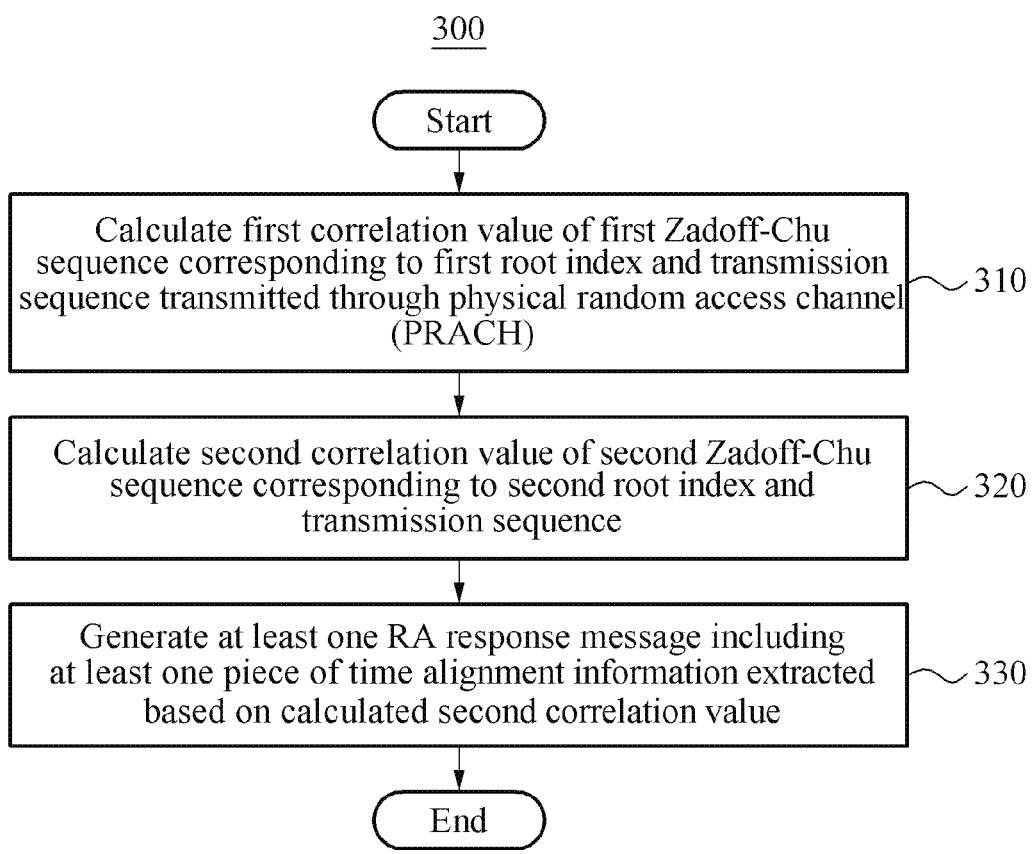
FIG. 3 is a flowchart illustrating a method by which a base station generates a random access (RA) response message according to an example embodiment.

FIG. 3 is a flowchart illustrating a method b which a base station generates a random access (RA) response message according to an example embodiment.

Referring to FIG. 3, a method 300 by which a base station generates a random access (RA) response message includes operation 310 of calculating a first correlation value of a first Zadoff-Chu sequence corresponding to a first root index and a transmission sequence transmitted through a physical random access channel (PRACH), operation 320 of calculating a second correlation value of a second Zadoff-Chu sequence corresponding to a second root index and the transmission sequence, and operation 330 of generating at least one RA response message including at least one piece of time alignment information extracted based on the calculated second correlation value.

In operation 310, the base station calculates the first correlation value with the first Zadoff-Chu sequence corresponding to a first root index r and a sequence $Y_{r,k}[n]$ received from at least one terminal through the PRACH. In more detail, the base station may calculate the first correlation value with the first Zadoff-Chu sequence as expressed in Equation 5 below.

$$|C_{(r,k),r}[\tau]| = \left| \frac{1}{\sqrt{N_{ZC}}} \sum_{n=0}^{N_{ZC}-1} Y_{r,k}[n] \times z_r^*[n+\tau] \right| \quad \text{[Equation 5]}$$

$$= \sum_{j=1}^{J} \sqrt{N_{ZC}} |h_j| \delta[\tau - (N_{CS} \times i + t_j)] + W[\tau]$$

In Equation 5, a position number of a sequence having a peak value associated with the preamble index is calculated as $N_{CS} \times t_3$. The base station may verify a preamble detection region corresponding to the position number, and calculate a preamble index i. For example, as expressed in Equation 5, the preamble index i may be detected from a range greater than or equal to $\tau = N_{CS} \times (i-1)$ and less than or equal to $\tau = N_{CS} \times i - 1$ corresponding to a detection region.

In operation 320, the base station calculates the second correlation value with the second Zadoff-Chu sequence corresponding to a second root index k and the received sequence $Y_{r,k}[n]$. The base station may use the preamble index i extracted in operation 310 as an input value of a root index function f(i). Thus, the base station may determine a second root index k=f(i) corresponding to a tag sequence. In more detail, the base station may calculate the second correlation value with the second Zadoff-Chu sequence using the calculated second root index k as expressed in Equation 6 below.

$$|C_{(r,k),k}[\tau]| = \left| \frac{1}{\sqrt{N_{ZC}}} \sum_{n=0}^{N_{ZC}-1} Y_{r,k}[n] \times z_k^*[n+\tau] \right| \quad \text{[Equation 6]}$$

$$= \sum_{j=1}^{J} \sqrt{N_{ZC}} |h_j| \delta[\tau - (N_{CS} \times l + t_j)] + W[\tau]$$

In Equation 6, a position number of a sequence having a peak value associated with the tag index is calculated as $N_{CS} \times l + t_j$. The peak value may indicate a peak having a magnitude greater than or equal to a predetermined threshold value. The base station may verify a tag detection region corresponding to the position number and calculate a tag index l. For example, as expressed in Equation 6, the tag index l may be detected from a range greater than or equal to $\tau = N_{CS} \times (l-1)$ and less than or equal to $\tau = N_{CS} \times l - 1$, corresponding to the detection region.

Although description of a method by which the base station detects one tag index l from the received sequence $Y_{r,k}[n]$ is provided in the present disclosure, the description is also applicable to an example in which a plurality of tag indexes $l_1$, $l_2$, and $l_3$, are detected from a received sequence. The base station may extract time alignment information corresponding to each of the calculated tag indexes $l_1$, $l_2$, and $l_3$.

In operation 330, the base station generates the RA response message including the extracted at least one time alignment information. In an example, when the extracted preamble index i is present within a predetermined first range, the base station may generate j RA response messages including the extracted preamble index i, extracted time alignment information, time alignment i,j, and RA third-step resource information, uplink resource grant i,j. For example, the first range indicates a range of a preamble index promised to be used by a fixed node.

In another example, when the extracted preamble index i is present within a predetermined second range, the base station may verify whether there is one piece of extracted time alignment information using the tag sequence. When there is one piece of extracted time alignment information, the base station may generate one RA response message including the extracted preamble index i, the extracted time alignment information $TA_{i,1}$, and RA third-step resource information $URG_{i,1}$.

Figure 4:
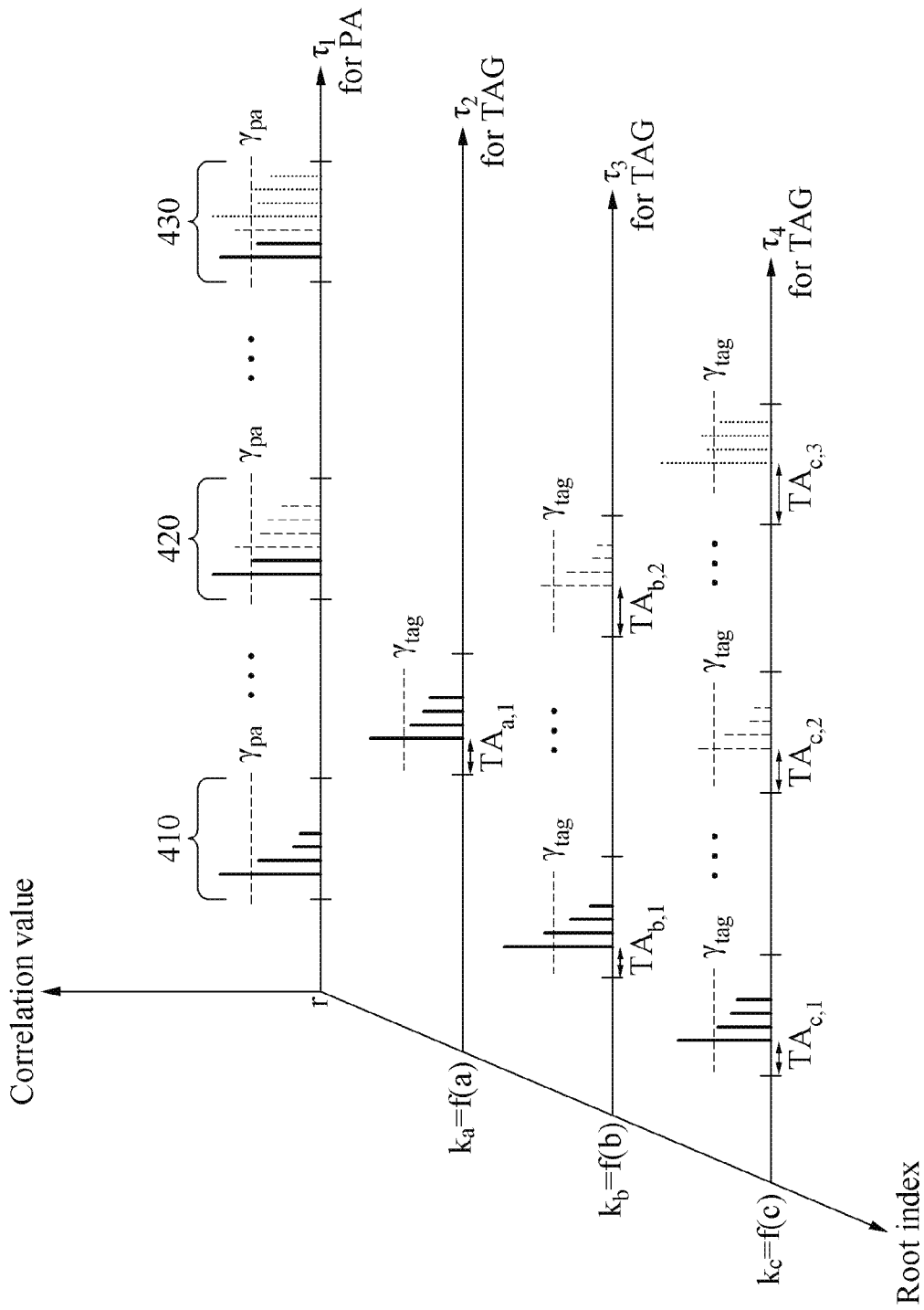
FIG. 4 illustrates a method by which a base station detects a preamble index and a tag index according to an example embodiment.

FIG. 4 illustrates a method by which a base station detects a preamble index and a tag index according to an example embodiment.

FIG. 4 illustrates a graph of which a Z-axis indicates a calculated correlation value, an X-axis indicates a root index, and a Y-axis indicates a position number of the correlation value. A base station may calculate a first correlation value of a first Zadoff-Chu sequence corresponding to a first root index r and a sequence $Y_{r,k}[n]$ received from at least one terminal through a physical random access channel (PRACH). The base station may detect a peak having a correlation value greater than or equal to a predetermined threshold $\gamma_{pa}$. In an example, it is assumed that a peak corresponding to a preamble index is extracted from a first region 410 corresponding to a first preamble index a, a second region 420 corresponding to a second preamble index b, and a third region 430 corresponding to a third preamble index c.

The base station may calculate a second root index $k_a=f(a)$ corresponding to an extracted peak using the first preamble index a as an input value of a root index function f(i). Further, the base station may calculate a second correlation value for extracting a tag sequence using a second Zadoff-Chu sequence corresponding to a second root index $k_a$. However, for example, one peak having a correlation value magnitude greater than or equal to a predetermined threshold value $\gamma_{tag}$ may be extracted from an entire region of a position number for detecting the second correlation value. The base station may extract time alignment information $TA_{a,1}$ from the one detected peak. In more detail, the base station may extract the time alignment information $TA_{a,1}$ from a first point in time that exceeds the predetermined threshold value $\gamma_{tag}$ from an l-th tag detection area corresponding to the preamble index a. In this example, the base station may generate an RA response message $RAR_{a,1}$ including the preamble index a, the time alignment information $TA_{a,1}$, and uplink resource information $URG_{a,1}$, and transmit the RA response message $RAR_{a,1}$ to a terminal.

Similarly, the base station may calculate a third root index $k_b=f(b)$ corresponding to the extracted value using the second preamble index b as the input value of the root index function f(i). Further, the base station may calculate a third correlation value for extracting a tag sequence using a third Zadoff-Chu sequence corresponding to a third root index $k_b$. In this example, two peaks having a cross correlation value magnitude greater than or equal to the predetermined threshold value $\gamma_{tag}$ may be detected from an entire region of a position number for detecting the third correlation value. The base station may extract two pieces of time alignment information, $TA_{b,1}$ and $TA_{b,2}$, from the respective two detected peaks. In this example, the base station may generate two RA response messages including a first RA response message $RAR_{b,1}$ including the preamble index b, the time alignment information $TA_{b,1}$, and the uplink resource information $URG_{a,1}$, and a second RA response message $RAR_{b,2}$ including the preamble index b, the time alignment information $TA_{b,2}$, and the uplink resource information $URG_{b,2}$, and transmit the RA response messages to a plurality of terminals.

Further, the base station may calculate a fourth root index $k_c=f(c)$ corresponding to the extracted value using a third preamble index c as the input value of the root index function f(i). Also, the base station may calculate a fourth correlation value for extracting a tag sequence using a fourth Zadoff-Chu sequence corresponding to a fourth root index $k_c$. In this example, three peaks the correlation value magnitude greater than or equal to the predetermined threshold value $\gamma_{tag}$ may be extracted from an entire region of a position number for detecting the fourth correlation value. The base station may extract three pieces of time alignment information, $TA_{b,1}$, $TA_{b,2}$, and $TA_{c,3}$, from the respective three detected peaks. In this example, the base station may generate three RA response messages $RAR_{c,1}$, $RAR_{c,2}$, and $RAR_{c,3}$ including the preamble index c, any one of the pieces of time alignment information $TA_{b,1}$, $TA_{b,2}$, and $TA_{c,3}$, and any one of the pieces of uplink resource information $URG_{c,1}$, $URG_{c,2}$, and $URG_{c,3}$, and transmit the RA response messages to the terminals.

Figure 5:
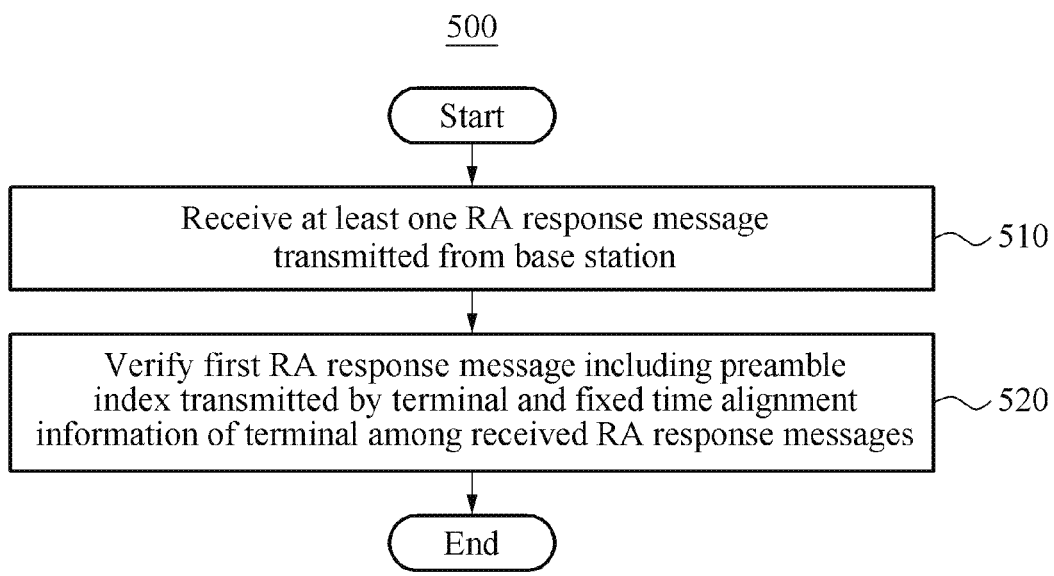
FIG. 5 is a flowchart illustrating a method by which a terminal performs a data transmission using a received random access (RA) response message according to an example embodiment.

FIG. 5 is a flowchart illustrating a method by which a terminal performs a data transmission using a received random access (RA) response message according to an example embodiment.

Referring to FIG. 5, a communication method 500 of a terminal for performing a data transmission using a received random access (RA) response message includes operation 510 of receiving at least one RA response message transmitted from a base station and operation 520 of verifying a first RA response message including a preamble index transmitted by the terminal and fixed time alignment information corresponding to the terminal among the at least one RA response message.

In operation 510, the terminal receives the at least one RA response message transmitted from the base station through a physical downlink shared channel (PDSCH). Although not illustrated in FIG. 5, operation 510 may be performed by a communicator or a communication interface included in the terminal.

In operation 520, the terminal verifies the first RA response message among the received RA response messages. In more detail, the terminal may verify the first RA response message including a preamble index i transmitted by the terminal and fixed time alignment information TA, of the terminal. When the first RA response message is verified, the terminal may transmit transmission data to the base station using uplink resource information $URG_i$ included in the first RA response message.

According to an example embodiment, a terminal that knows fixed time alignment information of the terminal may use the time alignment information as one piece of identification information. Thus, even when a preamble index collision occurs between the base station and a plurality of terminals, the terminals may be additionally identified as time alignment information corresponding to a tag index such that an effect of greatly reducing a possibility of failure of RA may be expected.

The example embodiments described herein may be implemented using hardware components, software components, and/or a combination thereof. For example, the apparatuses, methods, and constituent elements described in the example embodiments may be implemented using one or more general-purpose or special purpose computers, such as, for example, a processor, a controller, an arithmetic logic unit (ALU), a digital signal processor, a microcomputer, a field programmable array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal comprising a processor and that performs a random access (RA) procedure with a base station and is at least temporarily embodied by the processor, the terminal comprising:
    a generator configured to generate a preamble sequence using a first sequence corresponding to a first root index based on a preamble index that is randomly selected;
    a determiner configured to determine a second root index using the preamble index as an input value of a root index function; and
    a communicator configured to transmit a transmission sequence including the preamble sequence and the tag sequence to the base station through a physical random access channel (PRACH),
    wherein the generator is configured to generate a tag sequence using a second sequence corresponding to the second root index based on a tag index that is randomly selected,
    wherein the generator is configured to generate the preamble sequence by cyclically shifting the first Zadoff-Chu sequence corresponding to a 1-1-th root index in response to time alignment information of the terminal having a fixed value, and to generate the preamble sequence by cyclically shifting the first Zadoff-Chu sequence corresponding to a 1-2-th root index in response to the time alignment information of the terminal having a variable value,
    wherein the base station is configured to calculate a second correlation value of a second Zadoff-Chu sequence corresponding to the second root index and the transmission sequence, and to extract at least one piece of time alignment information based on the calculated second correlation value, and to determine whether a preamble collision is present based on at least one piece of the time alignment information corresponding to the tag sequence when a plurality of terminals transmit an identical preamble sequence.

2. The terminal of claim 1, wherein the root index function used by the determiner is set to output the second root index differing from the first root index in response to the preamble index being input.

3. The terminal of claim 1, wherein the generator is configured to randomly select the preamble index from a predetermined first range in response to time alignment information of the terminal having a fixed value, and to randomly select the preamble index from a predetermined second range in response to the time alignment information of the terminal having a variable value.

4. A base station comprising a processor and that performs a random access (RA) procedure with at least one terminal and is at least temporarily embodied by the processor, the base station comprising:
    a first calculator configured to calculate a first correlation value between a first Zadoff-Chu sequence corresponding to a first root index and a transmission sequence transmitted from the at least one terminal through a physical random access channel (PRACH);
    a second calculator configured to calculate a second correlation value between a second Zadoff-Chu sequence corresponding to a second root index and the transmission sequence;
    a generator configured to generate at least one RA response message including at least one piece of time alignment information extracted based on the calculated second correlation value; and wherein the base station is configured to determine whether a preamble collision is present based on the second Zadoff-Chu sequence, wherein the second calculator is configured to extract the at least one piece of time alignment information corresponding to the at least one terminal using at least one peak position number of which the second correlation value is greater than or equal to a predetermined threshold value, wherein the first calculator is configured to extract a preamble index included in the transmission sequence from the first correlation value, and the second calculator is configured to determine the second root index using the extracted preamble index as an input value of a root index function, and wherein the root index function used by the first calculator outputs the second root index to allow the first Zadoff-Chu sequence and the second Zadoff-Chu sequence to be in a cross correlation.

5. The base station of claim 4, wherein the generator is configured to generate the at least one RA response message including the extracted preamble index, any one piece of the time alignment information, and RA third-step resource information, in response to the extracted preamble index being present within a predetermined first range.

6. The base station of claim 4, wherein the generator is configured to generate one RA response message including RA third-step resource information, the extracted time alignment information, and the extracted preamble index in response to one piece of the extracted time align information, in response to the extracted preamble index being present within a predetermined second range.

* * * * *